United States Patent
Nigam

(10) Patent No.: US 6,197,383 B1
(45) Date of Patent: Mar. 6, 2001

(54) METHOD AND COMPOSITION FOR COATING PRE-SIZED PAPER WITH A MIXTURE OF A POLYACID AND A POLYBASE

(75) Inventor: Asutosh Nigam, Fremont, CA (US)

(73) Assignee: SRI International, Menlo Park, CA (US)

( * ) Notice: Subject to any disclaimer, the term of this patent is extended or adjusted under 35 U.S.C. 154(b) by 0 days.

(21) Appl. No.: 09/282,754

(22) Filed: Mar. 31, 1999

Related U.S. Application Data

(60) Provisional application No. 60/082,697, filed on Apr. 22, 1998.

(51) Int. Cl.$^7$ .................................................... B05D 5/04
(52) U.S. Cl. .................... 427/391; 427/393.5; 427/395; 427/411; 427/412.2; 427/412.3; 427/412.5; 427/414; 427/415
(58) Field of Search .............................. 427/411, 412.5, 427/412.2, 412.3, 393.5, 395, 4.4, 415, 391

(56) References Cited

U.S. PATENT DOCUMENTS

| | | |
|---|---|---|
| Re. 34,486 | 12/1993 | Waldmann . |
| 2,750,304 * | 6/1956 | Hendricks et al. ............... 427/411 |
| 2,860,073 * | 11/1958 | Hoel et al. ............... 427/411 |
| 3,046,155 * | 7/1962 | Reinke ............... 427/411 |
| 3,876,576 * | 4/1975 | Michalski ............... 260/29.2 UA |
| 3,908,071 | 9/1975 | Heim et al. . |
| 3,930,080 * | 12/1975 | Tanimoto et al. ............... 427/411 |
| 3,957,710 * | 5/1976 | Rohmann et al. ............... 427/411 |
| 3,996,056 | 12/1976 | Muller . |
| 4,012,324 * | 3/1977 | Gregor ............... 210/22 |
| 4,293,595 * | 10/1981 | Kreiling et al. ............... 427/411 |
| 4,295,931 | 10/1981 | Dumas . |
| 4,310,593 * | 1/1982 | Gross ............... 428/290 |
| 4,333,795 | 6/1982 | Street . |
| 4,336,306 * | 6/1982 | Fellows ............... 428/341 |
| 4,371,582 | 2/1983 | Sugiyama et al. . |
| 4,446,174 * | 5/1984 | Maekawa et al. ............... 427/214 |
| 4,478,682 | 10/1984 | Bankert et al. . |
| 4,517,142 * | 5/1985 | Baniel ............... 264/22 |
| 4,608,141 * | 8/1986 | Chlanda et al. ............... 204/182.5 |
| 4,645,511 | 2/1987 | Heller et al. . |
| 4,730,033 * | 3/1988 | Horley et al. ............... 528/288 |
| 4,733,247 | 3/1988 | Arai et al. . |
| 4,764,585 | 8/1988 | Heller et al. . |
| 4,872,951 | 10/1989 | Maliczyszyn et al. . |
| 4,877,680 | 10/1989 | Sakaki et al. . |
| 4,913,705 | 4/1990 | Schlick et al. . |
| 5,102,717 * | 4/1992 | Butters et al. ............... 427/146 |
| 5,131,951 * | 7/1992 | Yoshida et al. ............... 427/411 |
| 5,223,338 | 6/1993 | Malhotra . |
| 5,277,965 | 1/1994 | Malhotra . |
| 5,279,885 | 1/1994 | Ohmori et al. . |
| 5,478,631 | 12/1995 | Kawano et al. . |
| 5,502,091 | 3/1996 | Dasgupta . |
| 5,589,277 | 12/1996 | Malhotra . |
| 5,647,898 | 7/1997 | Fuertes et al. . |
| 5,698,478 | 12/1997 | Yamamoto et al. . |
| 5,709,976 | 1/1998 | Malhotra . |
| 5,712,027 | 1/1998 | Ali et al. . |
| 5,798,173 | 8/1998 | Momma et al. . |
| 6,303,738 * | 4/2000 | Michel et al. ............... 430/110 |

FOREIGN PATENT DOCUMENTS

| | | |
|---|---|---|
| 19505295 | 9/1995 | (DE) . |
| 19548927 | 7/1996 | (DE) . |
| 0775596 | 5/1997 | (EP) . |
| 61-98580 | 5/1986 | (JP) . |
| 9-254529 | 9/1997 | (JP) . |

* cited by examiner

*Primary Examiner*—Erma Cameron
(74) *Attorney, Agent, or Firm*—Dianne E. Reed; Reed & Associates

(57) ABSTRACT

The present invention features coating compositions and methods for improving the quality of images printed on a paper substrate. The novel coating compositions contain a coating agent comprising a mixture of a polyacid and a polybase. When applied to a sized paper substrate, the coating compositions provide a coated paper substrate that provides high quality printed images when printed with an ink containing a reactive dye having ionizable and/or nucleophilic groups capable of reacting with the coating agent. Images printed on a paper substrate coated with the coating composition of the invention are bleed-resistant, water-resistant (e.g., water-fast), and/or are characterized by an enhanced chroma and hue.

37 Claims, No Drawings

METHOD AND COMPOSITION FOR COATING PRE-SIZED PAPER WITH A MIXTURE OF A POLYACID AND A POLYBASE

CROSS-REFERENCE TO RELATED APPLICATIONS

This application is a continuation-in-part of U.S. provisional patent application 60/082,697, filed Apr. 22, 1998, which patent application is incorporated herein by reference.

TECHNICAL FIELD

The present invention relates generally to the production of coated paper, and more particularly relates to a novel paper coating process and novel compositions useful in conjunction therewith.

BACKGROUND

As printing technology advances, paper manufacturers are faced with the increasingly rigorous demands of their customers for high quality paper that is economically attractive. For example, there is a keen demand for papers that meet high quality standards with respect to brightness, opacity, and dry and/or wet strength, and that, upon printing with any of a wide range of colorants, provide a water-resistant printed image. The customer further demands that such papers be amenable to use with a variety of printing techniques, including not only conventional printing techniques, but also "impact free" printing techniques such as inkjet printing (particularly colored inkjet printing), laser printing, photocopying, and the like.

In response, paper manufacturers have attempted to meet their customers' demands for such high quality paper through a process termed "sizing." "Sizing," which encompasses both "internal sizing" and "external sizing," affects the manner in which colorants and particularly ink interact with the fibers of the paper. "Internal sizing" involves introduction of sizing compositions within the entire fibrous mass at the pulp stage of paper manufacturing (i.e., to the wet pulp, or more specifically, to the prepared papermaking furnish) before the stock is formed into a sheet, resulting in the distribution of the sizing composition within the entire fibrous mass that is subsequently used to produce the fibrous paper sheet. "External sizing" (also referred to as surface application, pasting, saturating or coating) involves application of a sizing composition to at least one surface of a fibrous paper sheet, so that the composition is present on or in at least one of the two faces of the fibrous sheet. Paper and paper-based products are internally and/or externally sized to increase the resulting paper's strength, resistance to picking and scuffing, and resistance to undue penetration of water, organic solvents, oils, inks, and various types of aqueous solutions. Sizing is also used to improve the paper's smoothness and optical characteristics. In general, sizing is recognized to confer a number of advantages, including but not limited to the foregoing, with perhaps resistance to penetration of water and aqueous inks (e.g., bleed resistance) of utmost importance.

Various materials have been used as external and/or internal sizing agents, such as conventional and modified starches, polyvinyl alcohol, cellulosic derivatives, gelatin, rosin, proteins such as casein, natural gums and synthetic polymers. Internal sizing agents are generally referred to as acid, neutral, or alkaline internal sizes. Acid sizes are typically rosin based and precipitated by alum. Neutral sizes may also be rosin-based, and are used at near-neutral pH, while alkaline sizes are synthetic materials such as alkenyl succinic anhydride (ASA) and alkyl ketene dimer (AKD). Although these materials are effective to various degrees under certain conditions, use of each is associated with certain limitations. For example, it is often necessary to use large amounts of these conventional sizing agents in order to provide paper having the desired properties. However, the opacity and brightness of the paper substrate decrease in direct proportion to the amount of sizing agent applied to the paper. Moreover, as the amount of sizing agent and/or the cost of the sizing agent increases, the cost of producing the paper increases, making high quality papers prohibitively expensive. Certain sizing agents impart relatively poor bleed resistance and water resistance of imprinted inks, and thus must be used with insolubilizing agents to ensure production of a printed paper having satisfactory water resistance.

Conventional and modified starches are the most common sizing agents in use in the industry. Exemplary starch-based sizing agents include hydrophobic starches (see, e.g., U.S. Pat. No. 2,661,349), blends of hydrophobic and non-hydrophobic starches (see, e.g., U.S. Pat. No. 4,239,592; EP 350,668), and blends of treated starches and/or cationic starches (see, e.g., U.S. Pat. No. 4,872,951; EP 620,315; U.S. Pat. No. 5,647,898). However, while starches may provide improved porosity, these compounds generally do not provide for improved bleed resistance or water resistance of inks printed on the treated paper substrates.

Several synthetic sizing agents are presently available, and may be used in internal sizing and/or external sizing processes. Exemplary synthetic sizing agents include hydrophobic cellulose reactive sizing agents (see, e.g., U.S. Pat. Nos. 4,478,682; 3,840,486), cationic polymers (see, e.g., U.S. Pat. No. 3,006,806), and water-soluble, poly (aminoamide) resins (see, e.g., U.S. Pat. No. 4,478,682). Synthetic compounds have also been used to enhance the dry and/or wet strength of paper (see, e.g., U.S. Pat. Nos. 5,138,669; 3,058,873; 5,510,004; 5,659,011), either at the internal sizing or external sizing steps. However, synthetic sizing agents tend to be expensive, due to both the cost of the starting material and the amount that is required to provide a paper substrate having the desired characteristics.

Use of conventional sizing agents normally results in a decrease in the porosity of the final paper substrate; thus, while the sized paper substrate may have the desired brightness and opacity, it may not provide for a printed image having a suitable optical density or color intensity. In addition, as the porosity of the paper increases, the paper becomes less amenable to various handling processes during manufacturing. For example, envelope manufacturers demand that the paper available to them have a relatively low porosity. If the porosity of the paper is too high, the paper is too stiff for handling by automated industrial devices for folding and sorting (e.g., devices of the "suction extractor" type) during envelope production. In contrast to lower porosity papers, high porosity papers also require slower machine speeds, and further require refining and draining operations that have relatively high energy costs. Both of these requirements result in decreases in plant productivity, efficiency, and cost effectiveness.

Paper manufacturers have also attempted to improve the water resistance of printed images on paper using various coating methods and compositions. For example, U.S. Pat. No. 5,709,976 describes coated paper having a hydrophobic barrier layer, which is composed of a water insoluble component and a water soluble or alcohol soluble anticurl agent, and an image receiving coating on the hydrophobic barrier layer, where the image receiving coating is composed of a polymeric binder, a dye fixative, a lightfastness inducing agent, a filler, and a biocide. While the coated paper provides for printed images having improved water resistance, the preparation of the coated paper requires multiple steps, e.g., a first step to coat the paper with a hydrophobic barrier layer, and then a second step to coat the paper with an image-receiving coating. These additional steps translate to additional manufacturing costs. Moreover, the components of such conventional coating compositions are often quite expensive, further adding to production costs.

There is a need in the field for coating agents and methods that provide an effective, cost efficient means for producing paper that yields a high quality, water-resistant printed image, that are amenable for use with a wide variety of paper substrates, and that are compatible with conventional manufacturing and post-manufacture handling processes.

SUMMARY OF THE INVENTION

The present invention features novel coating methods and coating compositions, wherein the coating compositions are composed of a mixture of a polyacid and a polybase. When applied to a sized paper substrate, the coating compositions provide a coated paper substrate that yields high quality printed images when printed with an ink containing a reactive dye having ionizable and/or nucleophilic groups capable of reacting with the coating agent. Images printed on a paper substrate coated with the coating composition of the invention are bleed-resistant, water-resistant (e.g., water-fast), and/or are characterized by an enhanced chroma and hue.

It is a primary object of the invention to address the above-mentioned need in the art by providing a coating composition that efficiently binds colorant upon printing, and thus provides an economical, efficient means for processing of paper to provide a high quality printed image thereon.

Another object of the invention is to provide a printed, coated paper substrate on which the printed image is high quality (particularly with respect to optical density and brightness), bleed-resistant and water-resistant.

Still another object of the invention is provide a method for coating paper using the coating compositions of the invention.

Still an additional object of the invention is to provide a method for printing on a coated paper substrate to provide water-resistant (e.g., water-fast) images thereon.

Additional objects, advantages and novel features of the invention will be set forth in part in the description which follows, and in part will become apparent to those skilled in the art upon examination of the following, or may be learned by practice of the invention.

DETAILED DESCRIPTION OF THE INVENTION

DEFINITIONS AND NOMENCLATURE:

It must be noted that, as used in the specification and the appended claims, the singular forms "a," "an" and "the" include plural referents unless the context clearly dictates otherwise. Thus, for example, reference to "a polyacid" in a composition means that more than one polyacid can be present in the composition, reference to "a polybase" in a composition means that more than one polybase can be present in the composition, reference to "a polymer" includes combinations of different polymers, and the like.

The term "paper" or "paper substrate" is meant to encompass a substrate based on cellulosic fibers; synthetic fibers such as polyamides, polyesters, polyethylene, and polyacrylic fibers; inorganic fibers such as asbestos, ceramic, and glass fibers; and any combination of cellulosic, synthetic, and inorganic fibers. The paper substrate may be of any dimension (e.g., size or thickness) or form (e.g., pulp, wet paper, dry paper, etc.). In most instances, the "paper" or "paper substrate" has been subjected to an external sizing process prior to treatment according to the methods of the invention. The paper substrate is preferably in the form of a flat or sheet structure, which structure may be of variable dimensions (e.g., size and thickness). "Paper" is meant to encompass printing paper (e.g., inkjet printing paper, etc.), writing paper, drawing paper, and the like, as well as board materials such as cardboard, poster board, Bristol board, and the like.

The term "sheet" or "flat structure" is not meant to be limiting as to dimension, roughness, or configuration of the substrate useful with the present invention, but rather is meant to refer to a product suitable for coating.

"Sized paper substrate" is a paper substrate as described above that has applied to its surface and/or is saturated with a sizing composition. Sizing compositions may be applied in an internal sizing step and/or in an external sizing step; preferably sizing (e.g., internal and/or external sizing) occurs prior to application of the coating composition of the invention.

"Polymer coating composition," "coating composition," or "top coat composition" as used herein generally refer to a composition that is minimally composed of a coating agent that is a mixture of a polyacid and a polybase.

"Coated paper substrate" is a paper substrate that has applied to its surface and/or is saturated with a coating composition of the invention. Coating compositions may be applied as a pretreatment (e.g., prior to printing), simultaneously with printing, or as an after-treatment. The coating compositions of the invention are applied in quantities suitable to provide the desired characteristics, such as bleed resistance, water resistance (e.g., water-fastness) of an ink printed on coated paper substrate, etc.

"Aqueous based ink" refers to an ink composed of an aqueous carrier medium and a colorant, such as a dye or a pigment dispersion. An aqueous carrier medium is composed of water or a mixture of water and one or more water-soluble organic solvents. Exemplary aqueous based ink compositions are described in detail below.

"Colorant" as used herein is meant to encompass dyes, pigments, stains, and the like compatible for use with the polymer coatings of the invention.

The term "colorant-reactive component" as used herein refers to a component (e.g., a chemical moiety) of a coating agent that is capable of reacting with a selected colorant, particularly a colorant having a nucleophilic and/or ionizable group, to form a coating agent-colorant complex. The coating agent-colorant complex is formed through either a covalent, electrostatic, or ionic association between the colorant-reactive component of the coating agent and the colorant. When a coating agent having a colorant-reactive component and a selected colorant from a coating agent-colorant complex in the context of a printed image on a coated paper substrate, the association between the colorant and the color-reactive component of the coating agent is effective to impart advantageous qualities to the printed image on the coated paper substrate, particularly with respect to water resistance, enhanced optical density, enhanced brightness, and the like.

The term "organic solvent" is used herein in its conventional sense to refer to a liquid organic compound, typically a monomeric organic material in the form of a liquid, preferably a relatively nonviscous liquid, the molecular structure of which contains hydrogen atoms, carbon atoms, and optionally other atoms as well, and which is capable of dissolving solids, gases or liquids.

The term "significant", as when used with reference to "significantly enhanced brightness" or "significantly improved water-fastness" generally refers to a difference in a quantifiable, measurable, or otherwise detectable parameter, e.g., optical density, LAB graphs (color sphere), dot spread, bleed through, between the two groups being compared (e.g., uncoated versus coated paper substrates) that is statistically significant using standard statistical tests. For example, the degree of visual wicking or water-fastness in a coated paper substrate as detected in a print assay may be quantified using standard methods, and the degree of wicking or water-fastness under different conditions can be compared for both coated and uncoated paper substrates to detect statistically significant differences.

The term "fluid resistance" is used herein to describe the resistance of a paper substrate to penetration by a fluid, with the term "water resistance" specifically referring to resistance of a paper substrate to penetration by a fluid.

The term "water-fast," is used herein to describe a form of water resistance, and which is normally used to refer to the nature of the ink composition after drying on a substrate. In general, "water-fast" means that the dried composition is substantially insoluble in water, such that upon contact with water, the dried ink retains at least about 70%, preferably at least about 85%, and more preferably at least about 95%, of optical density.

The term "bleed resistance" is meant to refer to the retardation of the penetration of water into paper, which retardation is associated with creation of a low energy hydrophobic surface at the fiber-water interface which increases the contact angle formed between a drop of liquid and the surface, and thus decreases the wettability. Contact angles have been shown to be sensitive to molecular packing, surface morphology, and chemical constitution of the paper substrate and any components added thereto.

The term "rub resistance" is normally meant to refer to a characteristic of the ink composition after drying on a substrate, more specifically, the ability of a printed image to remain associated with the substrate upon which it is printed despite application of force (e.g., rubbing) to the printed image. In general, "rub resistant" means that the dried ink composition is substantially resistant to rubbing force so that the dried ink retains at least about 70%, preferably at least about 85%, and more preferably at least about 95%, of optical density after rubbing of the printed image.

The term "alkyl" as used herein refers to a branched or unbranched saturated hydrocarbon group of 1 to 24 carbon atoms, such as methyl, ethyl, n-propyl, isopropyl, n-butyl, isobutyl, t-butyl, octyl, decyl, tetradecyl, hexadecyl, eicosyl, tetracosyl and the like, as well as cycloalkyl groups such as cyclopentyl, cyclohexyl and the like. The term "lower alkyl" intends an alkyl group of 1 to 6 carbon atoms, preferably 1 to 4 carbon atoms.

The term "alkylene" as used herein refers to a difunctional, branched or unbranched saturated hydrocarbon group of 1 to 24 carbon atoms, including without limitation methylene, ethylene, ethane-1,1-diyl, propane-2,2-diyl, propane-1,3-diyl, butane-1,3-diyl, and the like. "Lower alkylene" refers to an alkylene group of 1 to 6 carbon atoms.

The term "alkenyl" as used herein refers to a branched or unbranched hydrocarbon group of 2 to 24 carbon atoms containing at least one carbon-carbon double bond, such as ethenyl, n-propenyl, isopropenyl, n-butenyl, isobutenyl, t-butenyl, octenyl, decenyl, tetradecenyl, hexadecenyl, eicosenyl, tetracosenyl and the like. Preferred alkenyl groups herein contain 2 to 12 carbon atoms and 2 to 3 carbon-carbon double bonds. The term "lower alkenyl" intends an alkenyl group of 2 to 6 carbon atoms, preferably 2 to 4 carbon atoms, containing one —C=C— bond. The term "cycloalkenyl" intends a cyclic alkenyl group of 3 to 8, preferably 5 or 6, carbon atoms.

The term "alkenylene" refers to a difunctional branched or unbranched hydrocarbon chain containing from 2 to 24 carbon atoms and at least one carbon-carbon double bond. "Lower alkenylene" refers to an alkenylene group of 2 to 6, more preferably 2 to 5, carbon atoms, containing one —C=C— bond.

The term "alkoxy" as used herein intends an alkyl group bound through a single, terminal ether linkage; that is, an "alkoxy" group may be defined as —OR where R is alkyl as defined above. A "lower alkoxy" group intends an alkoxy group containing 1 to 6 carbon atoms.

The term "aryl" as used herein refers to an aromatic species containing 1 to 3 aromatic rings, either fused or linked, and either unsubstituted or substituted with 1 or more substituents typically selected from the group consisting of lower alkyl, halogen, —NH$_2$ and —NO$_2$. Preferred aryl substituents contain 1 aromatic ring or 2 fused or linked aromatic rings.

"Halo" or "halogen" refers to fluoro, chloro, bromo or iodo, and usually relates to halo substitution for a hydrogen atom in an organic compound.

The prefix "poly-" as in "polyacid" or "polybase" is intended to mean that the compound so designated has two or more acidic groups or two or more basic groups, respectively. Thus, the term "polyacid" herein encompasses a diacid, and the term "polybase" herein encompasses a dibase.

The term "polymer" is used herein in its conventional sense to refer to a compound having two or more monomer units, and is intended to include homopolymers as well as copolymers. The term "monomer" is used herein to refer to compounds which are not polymeric.

"Optionally" or "optionally" means that the subsequently described event or circumstance may or may not occur, and that the description includes instances where said event or circumstance occurs and instances where it does not. For example, the phrase "optionally substituted" aromatic ring means that the aromatic ring may or may not be substituted and that the description includes both an unsubstituted aromatic ring and an aromatic ring bearing one or more substituents.

OVERVIEW OF THE INVENTION:

The present invention is based upon the discovery that a composition containing a coating agent comprising a mixture of a polyacid and a polybase is effective in coating a sized paper substrate to provide numerous advantages. Coated paper substrate that has been treated with a coating composition of the invention yields high quality printed images having improved color fastness (the printed images do not run when exposed to moisture) as a result of the substantially non-reversible binding of aqueous colorants to the coating agent present in the coating composition. These images are therefore characterized as "water-resistant" or "water-fast" due to the characteristics of the printed image following exposure to water.

The coated paper substrates of the invention can be used in conventional printing, or with digital printing (particularly inkjet printing, including drop-on-demand printing and continuous printing) to provide highly brilliant, printed images that are significantly improved in color quality (for example, with respect to chroma and hue) when compared to uncoated paper substrates and/or to paper substrates coated with conventional coating compositions. The coating compositions and their methods of use according to the present invention thus provide a number of advantages over conventional sizing and coating methods, and sizing and coating compositions.

The coating compositions, methods of coating using the coating compositions described herein, and other features of the invention are described in greater detail below.

COATING COMPOSITIONS:

The coating compositions of the invention are composed of a coating agent comprising a mixture of a polyacid and a polybase. In general, the coating agents have a colorant-reactive component, which is capable of reacting with a selected colorant, particularly a colorant having a nucleophilic and/or ionizable group, to form a coating agent-colorant complex through a covalent, electrostatic, or ionic association. The association of the coating agent and colorant imparts bleed resistance, water resistance (e.g., waterfastness), and other desirable characteristics to the printed coated paper substrate. In addition to the coating agent, the coating compositions can include components such as binders, pigments, and other additives.

The coating compositions of the invention can be readily prepared from commercially available starting materials and/or reagents, are compatible with additional binders or additives, can be used with a variety of base papers, and are compatible with a variety of printing methods, including conventional and digital printing methods (particularly inkjet printing, including drop-on-demand printing and continuous printing), and can also be used with existing commercial paper production processes and equipment. The coating composition is inexpensive to prepare, and relatively small amounts are required to provide a coated paper substrate having the advantageous features described herein. The coating compositions of the invention are also easy to handle due to their solubility in water (the active components, the coating agents, are hydrophilic polymers), and do not require the use of large volumes of organic solvents. The novel coating compositions herein also possess good film-forming properties.

The coated paper substrate prepared using the composition of the invention exhibits improved durability, as evidenced by improved paper strength (e.g., tear strength), and stability upon prolonged storage. The coated paper does not discolor or yellow, and maintains a high degree of brightness for extended periods of time. Paper substrates treated with the coating compositions of the invention react rapidly and, in some embodiments, irreversibly with a number of aqueous based colorants, thus providing a versatile coating system for use with a wide variety of available colorants. Furthermore, because the colorant reacts quickly with the coating compositions, the coated printed substrate does not require a separate curing step, but rather is fast-drying. This fast-drying characteristic provides for printed images that are "non-sticky," thus allowing the printed coated paper substrate to be handled immediately after printing, e.g., to allowing stacking. The coated paper substrate of the invention can also be used to prepare images with varying degrees of gloss, depending upon variations in pigment.

In addition to their water resistance, paper substrates coated with a coating composition of the invention are highly bleed-resistant (as evidenced by small dot size measurements, i.e., less wicking action) and rub-resistant.

The various components of the coating composition will now be described.

1. COATING AGENTS

Coating agents in the coating compositions of the invention generally comprise a mixture of a polyacid and a polybase, wherein the polyacid and polybase may be either monomeric or polymeric. That is, the coating agent may be composed of any suitable combination of: 1) a monomeric polyacid and a monomeric polybase; 2) a polymeric polyacid and a polymeric polybase; 3) a polymeric polyacid and a monomeric polybase; and/or 4) a monomeric polyacid and a polymeric polybase. The selection of these combinations for use as a coating agent according to the invention will vary according to a variety of factors such as the nature of the paper substrate to be coated, the colorant to be used in printing on the sized paper substrate, etc. The relative ratios of the polyacid and polybase within the mixture will also vary according such factors, but typically the ratio of base to acid is in the range of approximately 1:1 to 10:1, more typically in the range of approximately 1:1 to 3:1. The coating agent typically represents approximately 5% to 95% of the coating composition, preferably approximately 10% to 95% of the coating composition, based upon total solids weight of the composition after drying.

The pH of the coating composition having a polyacid/polybase coating agent is generally neutral or basic, preferably at least about pH 7 or higher. The pH is maintained by the addition of appropriate bases such ammonia, primary, secondary, and tertiary alkyl amines, ethanolamines, diamine, and the like.

In general, monomeric polyacids will contain two or more carboxylic, sulfonic and/or phosphonic acid groups. Exemplary monomeric polyacids have the structural formula (I)

$$[R-(L_x-COOH)_y]_z \quad (I)$$

wherein: R is selected from the group consisting of alkyl, alkenyl, aryl of 1 to 3 rings which may be fused or linked, and 5- and 6-membered heterocyclic rings having from 1 to 3 heteroatoms selected from N, S and O; L is an alkylene or alkenylene chain containing 1 to 8 carbon atoms; x is 0 or 1; y is an integer in the range of 2 to 10 inclusive; and z is 1, 2 or 3, with the proviso that if z is 2 or 3, the distinct R groups are covalently linked to each other.

Specific examples of preferred monomeric polyacids include, but are not necessarily limited to, oxalic acid, maleic acid, succinic acid, methylsuccinic acid, malonic acid, adipic acid, glutaric acid, fumaric acid, dihydroxyfumaric acid, malic acid, mesaconic acid, itaconic acid, phthalic acid, isophthalic acid, terephthalic acid, 1,2-, 1,3- and 1,4-cyclohexane dicarboxylic acids, 1,2,3-cyclohexane tricarboxylic acid, 1,2,4-cyclohexane tricarboxylic acid, 1,3,5-cyclohexane tricarboxylic acid, 1,2- and 1,3-cyclopentane dicarboxylic acids, citric acid, tartaric acid, dihydroxy-terephthalic acid, 1,2,3-, 1,2,4- and 1,2,5-benzene tricarboxylic acids, tricarballylic acid, 1,2,4,5-benzene tetracarboxylic acid, norbornene tetracarboxylic acid, 3,3',4,4'-benzophenone tetracarboxylic acid, 1,2,3,4,5,6-benzene hexacarboxylic acid, aspartic acid, glutamic acid, and combinations thereof.

In general, monomeric polybases useful herein contain two or more primary, secondary or tertiary amino groups. Exemplary monomeric polybases have the structural formula (II)

$$[R-L_x-NR^5R^6)_y]_z \quad (II)$$

wherein $R^5$ and $R^6$ are hydrogen, alkyl, alkoxy, or hydroxyl-substituted alkoxy, and R, L, x, y and z are as defined with respect to the monomeric polyacid.

Specific examples of monomeric polybases include, but are not limited to, ethylenediamine, 1,2-propane diamine, 1,3-propanediamine, 1,2,3-triaminopropane, cis-1,2-cyclohexanediamine, trans-1,2-cyclohexanediamine, 1,3-bis(aminomethyl)cyclohexane, o-, m- and p-phenylenediamine, tetramethyl o-, m- and p-phenylenediamine, hexamethylenediamine, hexamethylenetetraamine, diethylenetriamine, tetraethylenepentamine, pentaethylenehexamine, pentamethyl diethylenetriamine, tris(2-aminoethyl)amine, 1,1,4,7,10,10-hexamethyl triethylenetetramine, tetramethyl-p-phenylenediamine, tetramethylethylenediamine, triethylenetetraamine, 4,4-bipyridyl, and combinations thereof.

The polymeric polyacids contain carboxylic, sulfonic and/or phosphonic acid groups, but most preferably contain carboxylic acid groups. Examples of polymeric polyacids include, without limitation, poly(acrylic acid), poly(acrylonitrile-acrylic acid), poly(styrene-acrylic acid), poly(butadiene-acrylonitrile acrylic acid), poly(butylacrylate-acrylic acid), poly(ethyl acrylate-acrylic acid), poly(methacrylate-acrylic acid), poly(methyl methacrylate-acrylic acid), poly(methyl methacrylate-styrene-acrylic acid), poly(vinyl pyrrolidone-acrylic acid), poly(styrene-co-maleic acid), poly(methyl methacrylate-styrene-co-maleic), poly(ethylene-propylene-acrylic acid), poly(propylene-acrylic acid), alginic acid, phytic acid, and combinations thereof.

The polymeric polybases comprise nitrogenous polymers that may have pendant primary, secondary or tertiary amine groups and/or nitrogenous moieties in the backbone, i.e., —NH— or —NR— groups. Exemplary polymeric polybases include, but are not limited to, polyethyleneimine, polyvinylpyridine, polyallylamine (including N-alkylated and N,N-dialkylated polyallylamines), polyvinylaziridine, polyimidazole, polylysine, chitosan, poly(amino and alkylated amino)ethylenes, ethoxylated polyethyleneimine, propoxylated polyethyleneimine, and combinations thereof.

2. FILM-FORMING BINDERS

The coating compositions of the invention preferably include a film-forming binder. By "film-forming binder" is meant a substance that provides for improved strength of a paper substrate upon application of the substance to the substrate. "Film-forming binders" used in connection with the coating compositions of the invention include any film-forming binder that is compatible with the selected coating agent and other components of the coating composition. Exemplary film-forming binders include, but are not necessarily limited to: polysaccharides and derivatives thereof, e.g., starches, cellulosic polymers, dextran and the like; polypeptides (e.g., collagen and gelatin); and synthetic polymers, particularly synthetic vinyl polymers such as poly(vinyl alcohol), poly(vinyl phosphate), poly(vinyl pyrrolidone), vinyl-pyrrolidone-vinyl acetate copolymers, vinyl acetate-acrylic acid copolymers, vinyl alcohol-vinyl acetate copolymers, vinyl pyrrolidone-styrene copolymers, and poly(vinyl amine), synthetic acrylate polymers and copolymers such as poly(acrylic acid-co-methacrylate), poly(vinyl-co-acrylate), and the like, and water-soluble or water-dispersible polyesters such as sulfopolyesters (e.g., as available from Eastek). The coating agents themselves serve as film-forming substances; however, as noted above, it may be desirable to use the coating agents with additional film-forming substances.

Polysaccharide binders: Starches, as noted above, represent one category of suitable film-forming binders for use herein. Suitable starches may be any of a variety of natural, converted, and synthetically modified starches. Exemplary starches include, but are not necessarily limited to starch (e.g., SLS-280 (St. Lawrence Starch)), cationic starches (e.g., Cato-72 (National Starch), hydroxyalkylstarch, wherein the alkyl has at least one carbon atom and wherein the number of carbon atoms is such that the material is water soluble, preferably from about 1 to about 10 carbon atoms, such as methyl, ethyl, propyl, butyl, or the like (e.g., hydroxypropyl starch #02382 (PolySciences, Inc.), hydroxyethyl starch #06733 (PolySciences, Inc.), Penford Gum 270 and 280 (Penford), and Film-Kote (National Starch)), starch blends (see, e.g., U.S. Pat. No. 4,872,951, describing a blend of cationic starch and starch treated with an alkyl or alkenyl succinic anhydride (ASA), preferably 1-octenyl succinic anhydride (OSA)), and the like. The film-forming binder can also be a synthetically produced polysaccharide, such as a cationic polysaccharide esterified by a dicarboxylic acid anhydride (see, e.g., U.S. Pat. No. 5,647,898). Additional saccharide binders include cellulosic materials such as alkyl celluloses, aryl celluloses, hydroxy alkyl celluloses, alkyl hydroxy alkyl celluloses, hydroxy alkyl celluloses, dihydroxyalkyl cellulose, dihydroxyalkyl cellulose, hydroxy alkyl hydroxy alkyl cellulose, halodeoxycellulose, amino deoxycellulose, dialkylammonium halide hydroxy alkyl cellulose, hydroxyalkyl trialkyl ammonium halide hydroxyalkyl cellulose, dialkyl amino alkyl cellulose, carboxy alkyl cellulose salts, cellulose sulfate salts, carboxyalkylhydroxyalkyl cellulose and the like). Still additional film-forming binders of this type include dextran (e.g., dialkyl aminoalkyl dextran, amino dextran, and the like), carrageenan, Karaya gum, xanthan, guar and guar derivatives, (e.g., carboxyalkyl hydroxyalkyl guar, cationic guar, and the like), and gelatin.

Additional exemplary film-forming binders include resins (e.g., such as formaldehyde resins such as melamine-formaldehyde resin, urea-formaldehyde resin, alkylated urea-formaldehyde resin, and the like ), ionic polymers (e.g., poly(2-acrylamide-2-methyl propane sulfonic acid, poly(N,N-dimethyl-3,5-dimethylene piperidinium chloride, poly(methylene-guanidine), and the like), maleic anhydride and maleic acid-containing polymers (e.g., styrene-maleic anhydride copolymers, vinyl alkyl ether-maleic anhydride copolymers, alkylene-maleic anhydride copolymers, butadiene-maleic acid copolymers, vinylalkylether-maleic acid copolymers, alkyl vinyl ether-maleic acid esters, and the like), acrylamide-containing polymers (e.g., poly(acrylamide), acrylamide-acrylic acid copolymers, poly(N,N-dimethyl acrylamide), and the like), poly(alkyleneimine)-containing polymers (e.g., poly(ethyleneimine), poly(ethyleneimine) epichlorohydrin, alkoxylated poly(ethyleneimine), and the like), polyoxyalkylene polymers (e.g., poly(oxymethylene), poly(oxyethylene), ethylene oxide/propylene oxide copolymers, ethylene oxide/2-hydroxyethyl methacrylate/ethylene oxide and ethylene oxide/hydroxypropyl methacrylate/ethyleneoxide triblock copolymers, ethylene oxide-4-vinyl pyridine/ethylene oxide triblock copolymers, ethylene oxide-isoprene/ethylene oxide triblock copolymers, epichlorohydrin-ethylene oxide copolymer, and the like), etc.

Any of the above exemplary film-forming binders can be used in any effective relative amounts, although typically the film-forming binder, if present, represents approximately 1 wt. % to 40 wt. %, preferably 1 wt. % to 25 wt. %, most preferably 1 wt.% to 15 wt. % of the composition, after drying on a substrate. Starches and latexes are of particular interest because of their availability and applicability to paper.

3. OTHER COATING COMPOSITION COMPONENTS

Additional coating composition components may include, but are not necessarily limited to, inorganic fillers, anti-curl agents, or additional conventional components such as a surfactant, plasticizer, humectant, UV absorber, light fastness enhancer, polymeric dispersant, dye mordant, optical brightener, or leveling agent, as are commonly known in the art. Illustrative examples of such additives are provided in U.S. Pat. Nos. 5,279,885 and 5,537,137. Of particular interest is the inclusion of additional components that provide for a coated substrate having a non-glossy, matte, or glossy surface; as will be appreciated by those skilled in the art, incorporation of a pigment (e.g., silica, calcium carbonate) will generally give rise to a non-glossy surface, while a glossy surface will result in the absence of a pigment (or in the presence of only a small amount of pigment), provided that the underlying substrate surface has a glossy finish at the outset (e.g., is resin coated or the like).

The coating compositions may also contain a colorant, e.g., a pigment, dye or other colorant, to provide for whiteness or color of the coated paper substrate. The coating compositions may also further include a crosslinking agent, such as zirconium acetate, ammonium zirconium carbonate, or the like, for intramolecular and/or intermolecular crosslinking of coating agents in the coating composition, and/or a chelating agent such as boric acid. Additional components that may be desirable for use in the coating compositions of the invention, as well as guidance for the use of such components and a general description of paper chemistry, are found in *PAPER CHEMISTRY, 2$^{nd}$ Edition*, Roberts, ed., Blackie Academic & Professional, Glasgow, UK (1994).

The coating composition is preferably provided in an aqueous liquid vehicle, although small amounts of a water-soluble organic solvent may be present. The aqueous liquid vehicle will generally be water, although other nonorganic compounds which are either water soluble or water miscible may be included as well. It may on occasion be necessary to add a solubilizing compound during preparation of the coating composition so that the components dissolve in the aqueous liquid vehicle, e.g., an inorganic base such as ammonia and/or an organic amine. Suitable organic amines include lower alkyl-substituted amines such as methylamine, dimethylamine, ethylamine, and trimethylamine, as well as ethanolamine, diethanolamine, triethanolamine, and substituted ethanolamines, typically lower alkyl-substituted ethanolamines such as N-methyl and N,N-dimethyl ethanolamines, and morpholine. Such compounds are also useful for bringing the pH into the desired range for basic formulations, and, if present, will generally represent not more than about 20 wt. % of the composition, and in most cases will represent not more than about 10 wt. % of the composition.

APPLICATION OF COATING COMPOSITIONS TO PAPER SUBSTRATES:

The coating compositions of the invention can be applied to a substrate, e.g., a paper substrate, by any of a number of conventional processes commonly employed in the art. The base stock or fibrous cellulosic substrate to be coated in accordance with the present invention can be one of a wide variety of types depending upon the intended use of the final product. The paper substrate is pre-sized, either internally or externally, and can vary in weight from lightweight papers to the heavier paperboards. However, where the coating is applied on-machine, in order to achieve acceptable manufacture speeds (e.g., 100 to 3000 ft./per minute), it is recommended that the weight of the paper base be greater than 30 grams per square meter. When the final product is to exhibit gloss at a satisfactory level (generally greater than 50), the base sheet, before it receives the top coating, should retard rapid drainage of the water or of the coating into the fibrous substrate. This is accomplished by sizing the sheet, either internally or externally but generally externally. Preferably, external sizing is included in an intermediate impregnation coating which serves as a base for the top coating.

The coating composition layer can range in thickness from several hundred Angstroms to several mils in thickness, e.g., in the range of approximately 100 Angstroms to 5 mm; typical amounts of the coating composition to be applied generally range from about 50 to about 500 pounds per ton of substrate, or about 2 to 30 g/m$^2$. In one embodiment, the coating composition is applied so that it does not substantially infiltrate into the substrate (e.g., the substrate is of a porosity such that the coating composition does not substantially penetrate beyond or far beyond the substrate surface). Application of a coating in a selected thickness can readily be done by one of skill in the art using known techniques, for example, by varying the coating agent concentration and number of coatings and through selection of the application means.

The coating composition as described above is applied to any desirable paper substrate, usually to a type of pre-sized paper substrate commonly used in printing. Substrates for use in the invention include cellulose and non-cellulose type substrates (e.g., synthetic fibers such as polyamides, polyesters, polyethylene, and polyacrylic fibers; inorganic fibers such as asbestos, ceramic, and glass fibers), and/or any combination of cellulosic, synthetic, and inorganic fibers, with porous cellulose substrates being preferred. Preferred substrate for use herein is generally free cut sheet paper, with exemplary paper substrates including, but not limited to, copier grade paper, business card stock, resin-coated papers, cartons such as milk cartons and cardboard gift boxes. Additional exemplary substrates for use in the invention include polyester films such as "MYLAR" flexible film, polysulfones, polyvinyls, cellulose triacetates, and the like. Coated transparent films are also contemplated.

Processes for coating pre-sized paper substrates are well known in the art, and can be performed either on-machine, as alluded to above, or off-machine, i.e., subsequent to completion of paper manufacture. Generally, coating is accomplished by dip coating, reverse roll coating, extrusion coating, saturation, and the like.

METHOD FOR PROVIDING WATER-RESISTANT IMAGES ON COATED PAPER:

The invention also features a method for providing a water-resistant (e.g., water-fast) printed image on paper by first applying to the surface of a paper substrate a coating composition of the invention to produce a coated substrate, and then applying a colorant to the coated substrate, where the colorant contains reactive ionizable and/or nucleophilic groups capable of reacting with the coating agent.

In general, aqueous inks are used in the preparation of a printed image on the coated paper substrates of the invention. The aqueous ink may be any suitable ink having a colorant, e.g., a pigment, dye, or stain, having one or more reactive groups suitable for reacting, either covalently or ionically, with a colorant-reactive component of the coating agent present on the coated paper substrate. The selection of the specific ink and colorant will vary with the colorant-reactive component of the coating agent used in the coating composition. Thus, preferred colorants for use in printing on a paper substrate coated with the present compositions are those containing one or more ionizable or nucleophilic moieties, e.g., having an amino, carboxy, sulfonato, thiosulfonato, cyano, hydroxy, halo, phosphonato or sulfidido group or the like.

The inks used in conjunction with the coated paper substrate of the invention may be inkjet inks. Water-soluble colorants in the inkjet inks may be acid dyes, direct dyes, basic dyes or dispersive dyes; preferred dyes for use in the invention are described in U.S. Pat. Nos. 5,425,805, 5,537,137, and 5,441,561.

The selection of the aqueous based ink will depend upon the requirements of the specific application, such as desired surface tension, viscosity, drying time, the type of paper substrate upon which the ink is to be applied (printing medium), and the like. The aqueous liquid vehicle of inks suitable for use in the invention will generally be deionized water, although other nonorganic compounds which are either water soluble or water miscible may be included as well. The colorant may be dissolved, dispersed or suspended in the aqueous liquid vehicle, and is present in an amount effective to provide the dried ink with the desired color and color intensity.

In some instances, the dye is contained in a carrier medium composed of ink and a water soluble organic solvent. For applications utilizing such a carrier medium, representative solvents include polyols such as polyethylene alcohol, diethylene glycol, propylene glycol, and the like. Additional solvents are simple alcohols such as ethanol, isopropanol and benzyl alcohol, and glycol ethers, e.g., ethylene glycol monomethyl ether, diethylene glycol monoethyl ether. Representative examples of water soluble organic solvents are described in U.S. Pat. No. 5,085,698 and U.S. Pat. No. 5,441,561.

Preferred colorants contained in the inks useful with the invention are dyes, including azo or "direct" dyes as well as dyes containing acidic groups (e.g., carboxylate, phosphonate or sulfonate moieties), basic groups (e.g., unsubstituted amines or amines substituted with 1 or 2 alkyl, typically lower alkyl, groups), or both. Specific examples of suitable colorants include, but are not limited to, the following: Dispersol Blue Grains (Zeneca, Inc.), Duasyn Acid Blue (Hoechst Celanese), Duasyn Direct Turquoise Blue (Hoechst Celanese), Phthalocyanine blue (C.I. 74160), Diane blue (C.I. 21180), Pro-jet Cyan I (Zeneca, Inc.), Pro-jet Fast Cyan 2 (Zeneca, Inc.), Milori blue (an inorganic pigment equivalent to ultramarine) as cyan colorants; Dispersol Red D-B Grains (Zeneca, Inc.), Brilliant carmine 6B (C.I. 15850), Pro-jet magenta 1 (Zeneca, Inc.), Pro-jet Fast magenta 2 (Zeneca, Inc.), Brilliant Red F3B-SF (Hoechst Celanese), Red 3B-SF (Hoechst Celanese), Acid Rhodamine (Hoechst Celanese), Quinacridone magenta (C.I. Pigment Red 122) and Thioindigo magenta (C.I. 73310) as magenta colorants; Dispersol Yellow D-7G 200 Grains (Zeneca, Inc.), Brilliant yellow (Hoechst Celanese), Pro-jet yellow 1 (Zeneca, Inc.), Pro-jet Fast Yellow 2 (Zeneca, Inc.), benzidine yellow (C.I. 21090 and C.I. 21100) and Hansa Yellow (C.I. 11680) as yellow colorants; organic dyes; and black materials such as carbon black, charcoal and other forms of finely divided carbon, iron oxide, zinc oxide, titanium dioxide, and the like. Specific and preferred black colorants include Acid Black 48 (Aldrich), Direct Black 58756 A (Crompton & Knowles), BPI Molecular Catalytic Gray (Brain Power), Fasday Cool Gray (Hunter Delator), Dispersol Navy XF Grains (Zeneca, Inc.), Dispersol Black CR-N Grains (Zeneca, Inc.), Dispersol Black XF Grains (Zeneca, Inc.), Disperse Black (BASF), Color Black FW18 (Degussa), Color Black FW200 (Degussa), Hostafine Black TS (Hoechst Celanese), Hostafine Black T (Hoechst Celanese), Duasyn Direct Black (Hoechst Celanese), Pro-jet Black 1 (Zeneca, Inc.) and Pro-jet Fast Black 2 (Zeneca, Inc.).

PRINTED COATED PAPER:

The invention also features a printed, coated paper substrate produced using the methods and compositions described herein. The printed, coated paper substrate of the invention can be produced by any of a variety of printing techniques, including inkjet printing, laserjet printing, photocopying, and the like. In general, the printing process involves applying an aqueous recording liquid to a coated paper substrate in an imagewise pattern. Inkjet printing processes are well known in the art; see, e.g., U.S. Pat. Nos. 4,601,777; 4,251,824; 4,410,899; 4,412,224; and 4,532,530.

The coated paper substrates of the invention can also be used in printing and/or copying process using dry or liquid electrophotographic-type developers, such as electrophotographic processes, ionographic process, and the like. The coated paper substrates of the invention can in addition be used in a process for generating images that involves generating an electrostatic latent image on an imaging member in an imaging apparatus, developing the latent image with a toner, and transferring the developed image to a coated paper substrate of the invention. Electrophotographic processes are known in the art, see, e.g., U.S. Pat. No. 2,297,691. Ionographic and electrographic processes are also well known in the art, see, e.g., U.S. Pat. Nos. 3,611,419; 3,564,556; 4,240,084; 4,569,584; 2,919,171; 4,524,371; 4,619,515; 4,463,363; 4,254,424; 4,538,163; 4,409,604; 4,408,214; 4,365,549; 4,267,556; 4,160,257; and 4,155,093.

The coated paper substrate of the invention can also be used in any other printing or imaging process, such as printing with pen plotters, handwriting with ink pens (either aqueous or nonaqueous based inks), offset printing processes, and the like.

EXPERIMENTAL

The following examples are put forth so as to provide those of ordinary skill in the art with a complete disclosure and description of how to prepare and use the compounds disclosed and claimed herein. Efforts have been made to ensure accuracy with respect to numbers (e.g., amounts, temperature, etc.) but some errors and deviations should be accounted for. Unless indicated otherwise, parts are parts by weight, temperature is in °C. and pressure is at or near atmospheric.

Also, in these examples, unless otherwise stated, the abbreviations and terms employed have their generally accepted meanings. Abbreviations and tradenames are as follows (note that suppliers of each material are indicated as well):

AR74=vinyl acetate/acrylic copolymer, 45% aqueous solution (Rohm & Haas);

Boric Acid=boric acid/ammonium hydroxide solution (Aldrich);

Carboset=polyacrylic acid (Carboset GA 1594, B.F. Goodrich);

Eastek=Eastek 1100 polymer (Eastman);

EPEI=ethoxylated polyethylene imine (37%, Aldrich);

Gum 280=starch (Penford Gum 280, Penford);

Jetcoat 20=25% calcium carbonate in water (Specialty Minerals);

Sif=fumed silica (Aerosil MOX 170, Air Products);

Sip=precipitated silica (FK310, Degussa);

SMA=styrene-maleic anhydride copolymer (Georgia Pacific);

Tinopal=brightener (Ciba Additives);

Unicrepe=adipic acid-diethylenetriamine copolymer (Georgia Pacific).

All patents, patent applications, journal articles and other references mentioned herein are incorporated by reference in their entireties.

EXAMPLE 1

MIXING PROCEDURES FOR ACID-BASE, NO-STARCH SYSTEMS

An exemplary acid-base coating formulation was prepared according to the following:

TABLE 1

Acid-Base, No Starch Formulation

| Component | % Solid | Wet gm used |
|---|---|---|
| 10% SMA | 8.8 | 81.2 |
| 35.4% Unicrepe | 39.1 | 28 |
| 37% EPEI | 39.1 | 7.9 |
| 45% AR74 | 14% | 2.7 |
| NH$_3$ (pH adjuster) | 7.8 | 1.2 |
| Water | balance | 2.2 |
| 1-Octanol (defoamer) | trace | |

The acid, base, and stearic maleic anhydride (SMA) were mixed together with constant stirring in an appropriate amount of water. The resulting mixture was rather thick. However, upon addition of ammonia, the mixture became less viscous. The polymer (AR74) and a drop of defoamer were then blended in and the resulting mixture was stirred for another half hour before coating onto a paper substrate.

EXAMPLE 2

POLYACID/POLYBASE COATING COMPOSITIONS

The following table summarizes exemplary coating compositions in accordance with the invention, wherein the coating agent is mixture of a polyacid and a polybase. Each of the representative formulations was effective to produce a coated paper substrate having the beneficial features described herein, i.e., with respect to bleeding, wicking and water-fastness.

What is claimed is:

1. A process for coating a solid substrate selected from the group consisting of pre-sized paper, resin-coated paper and polymeric films, comprising applying a coating agent present in a coating composition to the surface of the substrate, wherein the coating agent comprises a mixture of a polyacid and a polybase and the coating composition optionally includes up to approximately 40 wt. % of a film-forming binder, wherein the polyacid contains two or more carboxylic, sulfonic and/or phosphonic acid groups and the polybase contains two or more primary, secondary or tertiary amine groups.

2. The process of claim 1, wherein the polyacid and polybase are monomeric.

3. The process of claim 2, wherein the monomeric polyacid has the structural formula $$[R-(L_x-COOH)_y]_z$$

wherein:

R is selected from the group consisting of alkyl, alkenyl, aryl of 1 to 3 rings which may be fused or linked, and 5- and 6-membered heterocyclic rings having from 1 to 3 heteroatoms selected from N, S and O;

L is an alkylene or alkenylene chain containing 1 to 8 carbon atoms;

x is 0 or 1;

y is an integer in the range of 2 to 10 inclusive; and z is 1,2 or 3, with the proviso that if z is 2 or 3, the distinct R groups are covalently linked to each other, and the monomeric polybase has the structural formula $$[R-(L_x-NR^5R^6)_y]_z$$

wherein $R^5$ and $R^6$ are hydrogen, alkyl, alkoxy, or hydroxyl-substituted alkoxy, and R, L, x, y and z are as defined with respect to the monomeric polyacid.

4. The process of claim 3, wherein the monomeric polyacid is selected from the group consisting of oxalic acid, maleic acid, succinic acid, methylsuccinic acid, malonic acid, adipic acid, glutaric acid, fumaric acid, dihydroxyfumaric acid, malic acid, mesaconic acid, itaconic acid, phthalic acid, isophthalic acid, terephthalic acid, 1,2-, 1,3- and 1,4-cyclohexane dicarboxylic acids, 1,2,3-cyclohexane tricarboxylic acid, 1,2,4-cyclohexane tricarboxylic acid, 1,3,

TABLE 2

ACID/BASE COATINGS WITHOUT STARCH

| Formulation No. | Resin 1 (SMA) | Resin 2 | EPEI | Binder (AR74) | Boric Acid in NH$_4$OH | Pigment (1:4Sif:Sip) | Solids (%) |
|---|---|---|---|---|---|---|---|
| 5-2 | 21.4 | | 7.1 | | | 71.4 | 12.7 |
| 4-1 | 30.5 | | 10.2 | 8.4 | | 50.9 | 17.9 |
| 6-1 | 40.6 | | 40 | 8.6 | 10.1 | | 2.4 |
| 2-4 | 62.5 | | 20.8 | 16.7 | | | 8.6 |
| 2-3 | 65.9 | | 22 | | 12.1 | | 8.2 |
| 2-2 | 50 | Carboset, 16.7 | 16.7 | | | | 9.5 |
| 4-2 | 30 | Carboset, 10.0 | 10 | | | 50 | 18.2 |
| 7-1 | 23.8 | Unicrepe, 71.4 | | 4.8 | | | 8.4 |
| 9-1 | 23.8 | Unicrepe, 71.4 | | 4.8 | | | 4.2 |
| 9-2 | 21.3 | Unicrepe, 63.8 | | 4.3 | 10.6 | | 4.6 |
| 8-1 | 42.4 | Unicrepe, 42.4 | 15.2 | | | | 8.2 |
| 8-2 | 39.1 | Unicrepe, 39.1 | 14 | 7.8 | | | 8.8 |
| 8-3 | 39.1 | Unicrepe, 39.1 | 14 | 7.8 | | | 4.4 |
| 8-4 | 36.1 | Unicrepe, 36.1 | 12.9 | 7.2 | 7.2 | | 4.7 |

5-cyclohexane tricarboxylic acid, 1,2- and 1,3-cyclopentane dicarboxylic acids, citric acid, tartaric acid, dihydroxyterephthalic acid, 1,2,3-, 1,2,4- and 1,2,5-benzene tricarboxylic acids, tricarballylic acid, 1,2,4,5-benzene tetracarboxylic acid, norbornene tetracarboxylic acid, 3,3',4,4'-benzophenone tetracarboxylic acid, 1,2,3,4,5,6-benzene hexacarboxylic acid, aspartic acid, glutamic acid, and combinations thereof.

5. The process of claim 3, wherein the monomeric polybase is selected from the group consisting of ethylenediamine, 1,2-propane diamine, 1,3-propanediamine, 1,2,3-triaminopropane, cis-1,2-cyclohexanediamine, trans-1,2-cyclohexanediamine, 1,3-bis(aminomethyl)cyclohexane, o-, m- and p-phenylenediamine, tetramethyl o-, m- and p-phenylenediamine, hexamethylenediamine, hexamethylenetetraamine, diethylenetriamine, tetraethylenepentamine, pentaethylenehexamine, pentamethyl diethylenetriamine, tris(2-aminoethyl)amine, 1,1,4,7,10,10-hexamethyl triethylenetetramine, tetramethyl-p-phenylenediamine, tetramethylethylenediamine, triethylenetetraamine, 4,4'-bipyridyl, and combinations thereof.

6. The process of claim 4, wherein the monomeric polybase is selected from the group consisting of ethylenediamine, 1,2-propane diamine, 1,3-propanediamine, 1,2,3-triaminopropane, cis- 1,2-cyclohexanediamine, trans-1,2-cyclohexanediamine, 1,3-bis(aminomethyl)cyclohexane, o-, m- and p-phenylenediamine, tetramethyl o-, m- and p-phenylenediamine, hexamethylenediamine, hexamethylenetetraamine, diethylenetriamine, tetraethylenepentamine, pentaethylenehexamine, pentamethyl diethylenetriamine, tris(2-aminoethyl)amine, 1,1,4,7,10,10-hexamethyl triethylenetetramine, tetramethyl-p-phenylenediamine, tetramethylethylenediamine, triethylenetetraamine, 4,4'-bipyridyl, and combinations thereof.

7. The process of claim 1, wherein the polyacid and polybase are polymeric.

8. The process of claim 7, wherein the polymeric polyacid is a carboxylic acid-containing polymer and the polymeric polybase comprises a nitrogenous polymer.

9. The process of claim 8, wherein the polymeric polyacid is selected from the group consisting of poly(acrylic acid), poly(acrylonitrile-acrylic acid), poly(styrene-acrylic acid), poly(butadiene-acrylonitrile acrylic acid), poly(butylacrylate-acrylic acid), poly(ethyl acrylate-acrylic acid), poly(styrene-co-maleic acid), poly(ethylene-propylene-acrylic acid), poly(propylene-acrylic acid), alginic acid, phytic acid, and combinations thereof, and the polymeric polybase is selected from the group consisting of polyethyleneimine, polyvinylpyridine, polyallylamine (including N-alkylated and N,N-dialkylated polyallylamines), polyvinylaziridine, polyimidazole, polylysine, chitosan, poly(amino and alkylated amino)ethylenes, ethoxylated polyethyleneimine, propoxylated polyethyleneimine, and combinations thereof.

10. The process of claim 1, wherein the polyacid is monomeric and the polybase is polymeric.

11. The process of claim 10, wherein the monomeric polyacid has the structural formula

[R—(L$_x$—COOH)$_y$]$_z$

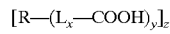

wherein:
R is selected from the group consisting of alkyl, alkenyl, aryl of 1 to 3 rings which may be fused or linked, and 5- and 6-membered heterocyclic rings having from 1 to 3 heteroatoms selected from N, S and O;

L is an alkylene or alkenylene chain containing 1 to 8 carbon atoms;

x is 0 or 1;

y is an integer in the range of 2 to 10 inclusive; and z is 1,2 or 3, with the proviso that if z is 2 or 3, the distinct R groups are covalently linked to each other, and the polymeric polybase comprises a nitrogenous polymer.

12. The process of claim 11, wherein the monomeric polyacid is selected from the group consisting of oxalic acid, maleic acid, succinic acid, methylsuccinic acid, malonic acid, adipic acid, glutaric acid, fumaric acid, dihydroxyfumaric acid, malic acid, mesaconic acid, itaconic acid, phthalic acid, isophthalic acid, terephthalic acid, 1,2-, 1,3- and 1,4-cyclohexane dicarboxylic acids, 1,2,3-cyclohexane tricarboxylic acid, 1,2,4-cyclohexane tricarboxylic acid, 1,3, 5-cyclohexane tricarboxylic acid, 1,2- and 1,3-cyclopentane dicarboxylic acids, citric acid, tartaric acid, dihydroxyterephthalic acid, 1,2,3-, 1,2,4- and 1,2,5-benzene tricarboxylic acids, tricarballylic acid, 1,2,4,5-benzene tetracarboxylic acid, norbornene tetracarboxylic acid, 3,3',4,4'-benzophenone tetracarboxylic acid, 1,2,3,4,5,6-benzene hexacarboxylic acid, aspartic acid, glutamic acid, and combinations thereof, and the polymeric polybase is selected from the group consisting of polyethyleneimine, polyvinylpyridine, polyallylamine (including N-alkylated and N,N-dialkylated polyallylamines), polyvinylaziridine, polyimidazole, polylysine, chitosan, poly(amino and alkylated amino)ethylenes, ethoxylated polyethyleneimine, propoxylated polyethyleneimine, and combinations thereof.

13. The process of claim 1, wherein the polyacid is polymeric and the polybase is monomeric.

14. The process of claim 13, wherein the polymeric polyacid is a carboxylic acid-containing polymer, and the monomeric polybase has the structural formula

[R—(L$_x$—NR$^5$R$^6$)$_y$]$_z$

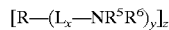

wherein:
R is selected from the group consisting of alkyl, alkenyl, aryl of 1 to 3 rings which may be fused or linked, and 5- and 6-membered heterocyclic rings having from 1 to 3 heteroatoms selected from N, S and O;

L is an alkylene or alkenylene chain containing 1 to 8 carbon atoms;

x is 0 or 1;

y is an integer in the range of 2 to 10 inclusive;

z is 1, 2 or 3; and

R$^5$ and R$^6$ are hydrogen, alkyl, alkoxy, or hydroxyl-substituted alkoxy, with the proviso that if z is 2 or 3, the distinct R groups are covalently linked to each other.

15. The process of claim 14 wherein the polymeric polyacid is selected from the group consisting of poly(acrylic acid), poly(acrylonitrile-acrylic acid), poly(styrene-acrylic acid), poly(butadiene-acrylonitrile acrylic acid), poly(butylacrylate-acrylic acid), poly(ethyl acrylate-acrylic acid), poly(styrene-co-maleic acid), poly(ethylene-propylene-acrylic acid), poly(propylene-acrylic acid), alginic acid, phytic acid, and combinations thereof, and the monomeric polybase is selected from the group consisting of ethylenediamine, 1,2-propane diamine, 1,3-propanediamine, 1,2,3-triaminopropane, cis-1,2-cyclohexanediamine, trans-1,2-cyclohexanediamine, 1,3-bis (aminomethyl)cyclohexane, o-, m- and p-phenylenediamine, tetramethyl o-, m- and p-phenylenediamine, hexamethylenediamine, hexamethylenetetraamine, diethylenetriamine, tetraethylenepentamine, pentaethylenehexamine, pentamethyl diethylenetriamine, tris(2-aminoethyl)amine, 1,1,4,7,10,10-hexamethyl triethylenetetramine, tetramethyl-p-phenylenediamine, tetramethylethylenediamine, triethylenetetraamine, 4,4'-bipyridyl, and combinations thereof.

16. The process of claim 1, wherein the coating composition is aqueous.

17. The process of claim 1, wherein the coating composition includes a film-forming binder.

18. The process of claim 17, wherein the film-forming binder represents approximately 1 wt. % to 40 wt. % of the coating composition.

19. The process of claim 18, wherein the film-forming binder represents approximately 1 wt. % to 25 wt. % of the coating composition.

20. The process of claim 19, wherein the film-forming binder represents approximately 1 wt. % to 15 wt. % of the coating composition.

21. The process of claim 20, wherein the film-forming binder is selected from the group consisting of polysaccharides, polypeptides, synthetic vinyl polymers, and derivatives thereof.

22. The process of claim 21, wherein the film-forming binder is a polysaccharide or a derivative thereof.

23. The process of claim 22, wherein the polysaccharide is starch.

24. The process of claim 22, wherein the polysaccharide is a cellulosic polymer.

25. The process of claim 22, wherein the polysaccharide is dextran.

26. The process of claim 22, wherein the film-forming binder is a polypeptide.

27. The process of claim 26, wherein the polypeptide is selected from the group consisting of collagen and gelatin.

28. The process of claim 21, wherein the film-forming binder is a synthetic vinyl polymer.

29. The process of claim 28, wherein the synthetic vinyl polymer is selected from the group consisting of poly(vinyl alcohol), poly(vinyl phosphate), poly(vinyl pyrrolidone), vinyl-pyrrolidone-vinyl acetate copolymers, vinyl acetate-acrylic acid copolymers, vinyl alcohol-vinyl acetate copolymers, vinyl pyrrolidone-styrene copolymers, and poly(vinylamine).

30. The process of claim 29, wherein the synthetic vinyl polymer is a vinyl pyrrolidone-styrene copolymer.

31. The process of claim 1, wherein the coating composition further includes a colorant.

32. The process of claim 1, wherein the coating agent represents approximately 5 wt. % to 95 wt. % of the coating composition, based upon total solids weight of the composition after drying.

33. A coated product comprising a solid substrate selected for the group consisting of pre-sized paper, resin-coated paper and polymeric films coated by the process of claim 1.

34. A coated product comprising a solid substrate selected for the group consisting of pre-sized paper, resin-coated paper and polymeric films coated by the process of claim 2.

35. A coated product comprising a solid substrate selected for the group consisting of pre-sized paper, resin-coated paper and polymeric films coated by the process of claim 7.

36. A coated product comprising a solid substrate selected for the group consisting of pre-sized paper, resin-coated paper and polymeric films coated by the process of claim 10.

37. A coated product comprising a solid substrate selected for the group consisting of pre-sized paper, resin-coated paper and polymeric films coated by the process of claim 13.

* * * * *